No. 782,155. PATENTED FEB. 7, 1905.
C. W. MAXON.
PNEUMATIC TIRE.
APPLICATION FILED JULY 11, 1904.
2 SHEETS—SHEET 1.
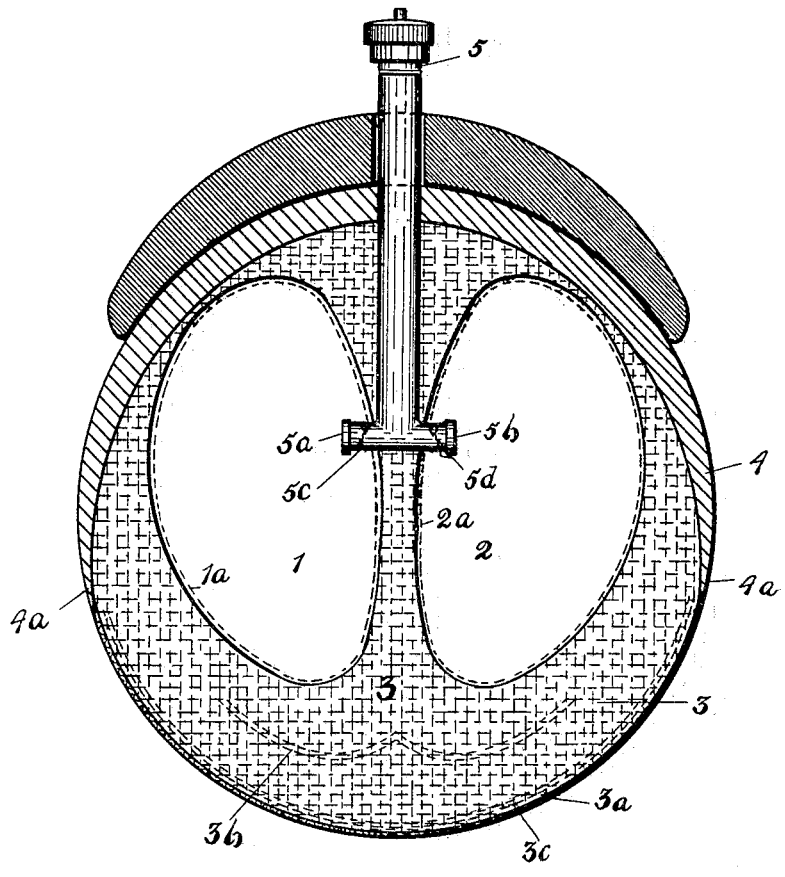
FIG. 1.
FIG. 3.
WITNESSES:
J. S. Lee.
N. D. Cathcart.
Carl W. Maxon, INVENTOR
BY
Geo. B. Willcox, ATTORNEY No. 782,155. PATENTED FEB. 7, 1905.
C. W. MAXON.
PNEUMATIC TIRE.
APPLICATION FILED JULY 11, 1904.
2 SHEETS—SHEET 2.
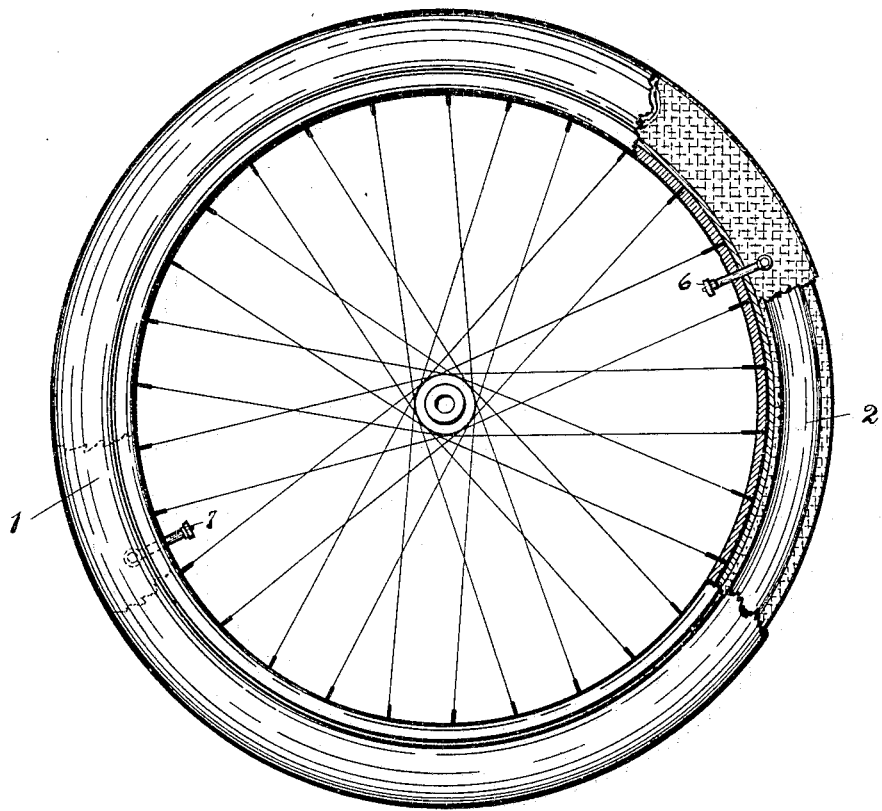
WITNESSES:
INVENTOR
Carl W. Maxon.
BY
ATTORNEY No. 782,155.

Patented February 7, 1905.

UNITED STATES PATENT OFFICE.

CARL W. MAXON, OF WEST BAY CITY, MICHIGAN.

PNEUMATIC TIRE.

SPECIFICATION forming part of Letters Patent No. 782,155, dated February 7, 1905.

Application filed July 11, 1904. Serial No. 216,168.

*To all whom it may concern:*

Be it known that I, CARL W. MAXON, a citizen of the United States, residing at West Bay City, in the county of Bay and State of Michigan, have invented certain new and useful Improvements in Pneumatic Tires; and I do hereby declare the following to be a full, clear, and exact description of the invention, such as will enable others skilled in the art to which it appertains to make and use the same.

This invention is a pneumatic tire for bicycles, automobiles, and other vehicles; and the improvements consist in certain constructions and arrangements of parts whereby the objects of my invention are accomplished. These objects are to provide in a single-tube tire two air-chambers independent of each other and capable of being inflated independently, and a puncture of one of the air-chambers will not affect the other.

The improvement further consists in surrounding the air-chambers by a fabric of woven asbestos, the lower surface of which is treated with liquid rubber and vulcanized to form a puncture-resisting cushion.

The invention is illustrated in the accompanying drawings, in which—

Figure 1 is a transverse section of a tire. Fig. 2 is a side view of a wheel with the tire in place, the tire being broken away in parts to show its inner construction. Fig. 3 is an enlarged cross-sectional view of the reinforcing-mesh.

1 and 2 are tubes or air-chambers extending lengthwise the tire. These chambers may be formed of rubber, as is common in the usual type of inner-tube tires.

$1^a$ and $2^a$ represent the inner tubes.

3 is an asbestos cushion surrounding tubes 1 and 2, forming a practically cylindrical tire. The upper portion of the cushion 3 is inclosed in a rubber sheathing 4 of practically semicircular cross-section, the outer edges $4^a$ being tapered to conform to the curve of the cushion 3. As above stated, cushion 3 consists in a fabric built up of woven asbestos fiber. A reinforcing-sheathing $3^c$, formed of a mesh of interwoven asbestos-covered wires $3^d$, is shaped to surround and protect the tread of the cushion 3. When cushion 3, sheathing 4, and reinforcing-mesh $3^c$ are assembled as shown in Fig. 1, the tire is dipped in liquid rubber and afterward vulcanized. The rubber penetrates into the cushion and through the asbestos-covered mesh a short distance, forming a sheathing of rubber and asbestos fiber which is extremely tough and practically puncture-proof. This sheathing is shown at $3^a$ in Fig. 1. To further protect the tubes 1 and 2 against puncture, I introduce into the asbestos cushion 3 a laminated chain $3^b$, extending the whole length of the tire. This chain may be of any suitable construction, such devices being common in the art of tire-making.

To inflate chambers 1 and 2, I provide a suitable inflating-valve 5, the stem of which is provided with two outlets $5^a$ and $5^b$, one communicating with each chamber. A check-valve $5^c$ is provided in the outlet $5^a$, and a similar valve $5^d$ is provided in the outlet $5^b$. These valves are so arranged as to permit air to flow from the valve 5 into either chamber, but to prevent the escape of air from either chamber into the outlets $5^a$ and $5^b$. The puncture of one chamber will therefore not deflate the other. While I prefer to construct the valve 5, as shown, with two outlets, the two tubes might also be independently inflated by means of two independent valves, as 6 and 7, as shown in Fig. 2, where the valve 6 communicates with chamber 2 and valve 7 communicates with chamber 1.

What I claim as my invention, and desire to secure by Letters Patent, is as follows:

In a pneumatic tire, the combination with an outer casing of a pair of air-tubes inclosed within said casing; an air-valve for each tube; an asbestos cushion surrounding said air-tubes and inclosed within said casing; said outer casing being formed of a mesh built up of asbestos-covered wires, said mesh being coated with rubber, substantially as and for the purposes set forth.

In testimony whereof I affix my signature in presence of two witnesses.

CARL W. MAXON.

Witnesses:
A. A. EASTERLY,
W. I. CATHCART.